United States Patent
Shimazaki et al.

(10) Patent No.: US 12,515,623 B2
(45) Date of Patent: Jan. 6, 2026

(54) VEHICLE CONTROL SYSTEM

(71) Applicants: TOYOTA JIDOSHA KABUSHIKI KAISHA, Toyota (JP); ADVICS CO., LTD., Kariya (JP)

(72) Inventors: Misuzu Shimazaki, Toyota (JP); Yusuke Kamiya, Toyota (JP); Tatsushi Kobayashi, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 1004 days.

(21) Appl. No.: 17/586,115

(22) Filed: Jan. 27, 2022

(65) Prior Publication Data

US 2022/0281424 A1   Sep. 8, 2022

(30) Foreign Application Priority Data

Mar. 4, 2021   (JP) ................................ 2021-034142

(51) Int. Cl.
*B60T 8/171*   (2006.01)
*B60T 7/04*   (2006.01)
(Continued)

(52) U.S. Cl.
CPC .............. *B60T 8/171* (2013.01); *B60T 7/042* (2013.01); *B60T 8/344* (2013.01); *B60T 13/146* (2013.01);
(Continued)

(58) Field of Classification Search
CPC ........ B60T 7/042; B60T 8/344; B60T 13/146; B60T 13/586; B60T 13/662; B60T 13/686; B60T 17/22; B60W 10/188; B60W 30/06
See application file for complete search history.

(56) References Cited

U.S. PATENT DOCUMENTS

2011/0266106 A1* 11/2011 Suzuki .................... B60T 8/96
                                                              188/360
2015/0069828 A1*  3/2015 Ueno ..................... B60T 13/146
                                                              303/14

(Continued)

FOREIGN PATENT DOCUMENTS

JP   2001-294146 A   10/2001
JP   2013-208987 A   10/2013
(Continued)

*Primary Examiner* — Nicholas J Lane

(74) *Attorney, Agent, or Firm* — Sughrue Mion, PLLC

(57) ABSTRACT

A vehicle control system includes a brake mechanism and a first power source. The brake mechanism includes: a hydraulic brake provided for a vehicle wheel to suppress rotation of the wheel in accordance with a hydraulic pressure; a hydraulic pressure supply device including a high-pressure source that supplies a high hydraulic pressure, and first and second electromagnetic valves, to supply the hydraulic pressure to the hydraulic brake by controlling the first electromagnetic valve using the hydraulic pressure; and a control device that performs drive assist control by controlling the hydraulic pressure supply device. The first power source supplies power to the brake mechanism. The control device supplies a current to a solenoid of the first electromagnetic valve while suspending supply of a current to a solenoid of the second electromagnetic valve when a voltage of the first power source is lower than a set voltage during the drive assist control.

10 Claims, 7 Drawing Sheets

(51) Int. Cl.
  *B60T 8/34*    (2006.01)
  *B60T 13/14*   (2006.01)
  *B60T 13/58*   (2006.01)
  *B60T 13/66*   (2006.01)
  *B60T 13/68*   (2006.01)
  *B60T 17/22*   (2006.01)
  *B60W 10/188*  (2012.01)
  *B60W 30/06*   (2006.01)

(52) U.S. Cl.
  CPC .......... *B60T 13/586* (2013.01); *B60T 13/662* (2013.01); *B60T 13/686* (2013.01); *B60T 17/22* (2013.01); *B60W 10/188* (2013.01); *B60W 30/06* (2013.01); *B60W 2710/18* (2013.01)

(56) References Cited

U.S. PATENT DOCUMENTS

| | | | |
|---|---|---|---|
| 2017/0008502 A1* | 1/2017 | Kanamori | B60T 13/662 |
| 2018/0273008 A1* | 9/2018 | Kim | B60T 13/58 |
| 2020/0108813 A1* | 4/2020 | Kim | B60T 13/662 |
| 2020/0114893 A1* | 4/2020 | Kim | B60T 13/745 |
| 2020/0290583 A1* | 9/2020 | Narematsu | B60T 13/686 |

FOREIGN PATENT DOCUMENTS

| | | |
|---|---|---|
| JP | 2020-82813 A | 6/2020 |
| JP | 2020-147185 A | 9/2020 |
| WO | 2013/144702 A2 | 10/2013 |

\* cited by examiner

VEHICLE CONTROL SYSTEM

CROSS-REFERENCE TO RELATED APPLICATION

This application claims priority to Japanese Patent Application No. 2021-034142 filed on Mar. 4, 2021, incorporated herein by reference in its entirety.

BACKGROUND

1. Technical Field

The present disclosure relates to a vehicle control system configured to apply a braking force to a vehicle.

2. Description of Related Art

Japanese Unexamined Patent Application Publication No. 2001-294146 (JP 2001-294146 A) describes a vehicle brake system that includes a regenerative brake device and a hydraulic brake device. In this vehicle brake system, a pump motor is controlled such that the hydraulic pressure in an accumulator is kept within a set range when the voltage of a battery is within a normal range. This control is referred to as "normal-time control". When the voltage of the battery is low and a brake operation member is operated, however, the pump motor is continuously actuated. Consequently, a reduction in the hydraulic pressure in the accumulator is suppressed, and a reduction in the hydraulic pressure to be supplied to the hydraulic brake is suppressed. The normal-time control is performed when the voltage of the battery is raised by the actuation of the regenerative brake, or when the operation of the brake operation member is canceled.

SUMMARY

The present disclosure provides a vehicle control system configured to control a hydraulic pressure supply device and reduce power consumption when the voltage of a power source is reduced during drive assist control.

A first aspect of the present disclosure provides a vehicle control system including a brake mechanism and a first power source. The brake mechanism includes a hydraulic brake provided for a wheel of a vehicle and configured to suppress rotation of the wheel in accordance with a hydraulic pressure, a hydraulic pressure supply device including a high-pressure source configured to supply a high hydraulic pressure and a plurality of electromagnetic valves, and configured to supply the hydraulic pressure from the high-pressure source to the hydraulic brake by controlling the hydraulic pressure using one or more first electromagnetic valves, among the electromagnetic valves, and a control device configured to perform drive assist control on the vehicle by performing control having control on the hydraulic pressure supply device. The first power source is configured to supply power to the brake mechanism. The control device is configured to control a current supplied to a solenoid of the one or more first electromagnetic valves and a current supplied to a solenoid of one or more second electromagnetic valves among the electromagnetic valves to be zero when a voltage of the first power source is lower than a set voltage during the drive assist control, the one or more second electromagnetic valves being different from the one or more first electromagnetic valves.

In the first aspect, the vehicle control system may include a second power source configured to supply power to the brake mechanism when the voltage of the first power source is lower than the set voltage. The control device may be configured to control the current supplied to the solenoid of the one or more first electromagnetic valves and the current supplied to the solenoid of the one or more second electromagnetic valves to be zero when power is supplied from the second power source to the brake mechanism during the drive assist control.

In the first aspect, the hydraulic pressure supply device may include a master cylinder that includes a pressurizing piston. The master cylinder may have a back-surface chamber located rearward of the pressurizing piston and a pressurizing chamber provided located forward of the pressurizing piston. The master cylinder may be configured to supply a hydraulic pressure in the pressurizing chamber to the hydraulic brake. The hydraulic pressure supply device may include a back-surface hydraulic pressure control device connected to the back-surface chamber and configured to control a hydraulic pressure in the back-surface chamber by using the one or more first electromagnetic valves. The one or more second electromagnetic valves may be provided between the master cylinder and at least one of a stroke simulator and a reservoir.

In the first aspect, the master cylinder may include an input piston that operates in conjunction with a brake operation member and that is provided rearward of the pressurizing piston so as to move relative to the pressurizing piston via an input chamber. The one or more second electromagnetic valves may include an input chamber shut-off valve provided between the input chamber and the stroke simulator. The input chamber shut-off valve may be configured to shut off the input chamber from the stroke simulator by being closed when a current supplied to a solenoid of the input chamber shut-off valve is zero.

In the first aspect, the back-surface hydraulic pressure control device may include a regulator configured to be actuated in accordance with a hydraulic pressure in a control chamber. The one or more first electromagnetic valves may include a pressure increasing linear valve provided between the control chamber and the high-pressure source and a pressure decreasing linear valve provided between the control chamber and a low-pressure source. The control device may be configured to bring the current supplied to the solenoid of the one or more second electromagnetic valves to zero, and control a current supplied to a solenoid of the pressure increasing linear valve and a current supplied to a solenoid of the pressure decreasing linear valve, when the voltage of the first power source is lower than the set voltage during the drive assist control.

In the first aspect, the control device may be configured to control each of the current supplied to the solenoid of the pressure increasing linear valve and the current supplied to the solenoid of the pressure decreasing linear valve such that a sum of the current supplied to the solenoid of the pressure increasing linear valve and the current supplied to the solenoid of the pressure decreasing linear valve does not exceed a limit current value.

In the first aspect, the control device may be configured to supply a current of a first set current value to the solenoid of the pressure decreasing linear valve, and control the current supplied to the solenoid of the pressure increasing linear valve such that a range does not exceed a current of a value obtained by subtracting the first set current value from the limit current value.

In the first aspect, the control device may be configured to decrease the current supplied to the pressure decreasing linear valve to a second set current value that is smaller than the first set current value when a time that has elapsed since the voltage of the first power source becomes lower than the set voltage exceeds a first set time.

In the first aspect, the control device may be configured to end control for the current supplied to the solenoid of the pressure increasing linear valve and control for the current supplied to the solenoid of the pressure decreasing linear valve when the time that has elapsed since the voltage of the first power source becomes lower than the set voltage exceeds a second set time that is longer than the first set time.

In the first aspect, the high-pressure source may include a pump motor, a pump configured to be actuated by the pump motor, and an accumulator configured to store a hydraulic pressure discharged from the pump. The control device may include a motor control unit configured to raise the hydraulic pressure in the accumulator to be higher than a set pressure determined in advance by actuating the pump motor before the drive assist control is started.

In the first aspect described above, when the voltage of the power source is reduced during the drive assist control, the current supplied to the solenoid of at least one of the electromagnetic valves included in the hydraulic pressure supply device is brought to zero from a value that is larger than zero. Consequently, it is possible to reduce the amount of power consumed by the hydraulic pressure supply device, and control the hydraulic pressure supply device. Since it is possible to control the hydraulic pressure supply device, in addition, the vehicle can be stopped by actuating the hydraulic brake even without the driver operating the brake operation member.

A second aspect of the present disclosure provides a vehicle control system including a first power source and a brake mechanism. The brake mechanism includes a hydraulic brake provided for a wheel of a vehicle and configured to suppress rotation of the wheel in accordance with a hydraulic pressure, a hydraulic pressure supply device including a high-pressure source configured to supply a high hydraulic pressure and a plurality of electromagnetic valves, and configured to supply the hydraulic pressure from the high-pressure source to the hydraulic brake by controlling one or more first electromagnetic valves among the electromagnetic valves, and a control device configured to control the hydraulic pressure supply device. The hydraulic pressure supply device includes a master cylinder that includes a pressurizing piston. The master cylinder has a back-surface chamber provided rearward of the pressurizing piston and a pressurizing chamber provided forward of the pressurizing piston. The master cylinder is configured to supply a hydraulic pressure in the pressurizing chamber to the hydraulic brake. The hydraulic pressure supply device includes a back-surface hydraulic pressure control device connected to the back-surface chamber and configured to control a hydraulic pressure in the back-surface chamber by using the first electromagnetic valves. One or more second electromagnetic valves, among the electromagnetic valves, are provided between the master cylinder and at least one of a stroke simulator and a reservoir, the second electromagnetic valves being different from the first electromagnetic valves. The first power source is configured to supply power to the brake mechanism. The control device is configured to control a current supplied to a solenoid of the one or more first electromagnetic valves and a current supplied to a solenoid of the one or more second electromagnetic valves to be zero when a voltage of the first power source is lower than a set voltage.

With the second aspect described above, the vehicle can be stopped by actuating the hydraulic brake even without the driver operating the brake operation member.

A third aspect of the present disclosure provides a vehicle control system including a first power source and a brake mechanism. The brake mechanism includes a hydraulic brake provided for a wheel of a vehicle and configured to suppress rotation of the wheel in accordance with a hydraulic pressure, a hydraulic pressure supply device including a high-pressure source configured to supply a high hydraulic pressure, a first electromagnetic valve, and a second electromagnetic valve, and configured to supply the hydraulic pressure from the high-pressure source to the hydraulic brake by controlling the first electromagnetic valve using the hydraulic pressure, and a control device configured to perform drive assist control on the vehicle by controlling the hydraulic pressure supply device. The first power source is configured to supply power to the brake mechanism. The control device is configured to perform control such that the control device suspends supply of a current to a solenoid of the second electromagnetic valve and supplies a current to a solenoid of the first electromagnetic valve when a voltage of the first power source is lower than a set voltage during the drive assist control.

With the third aspect described above, the vehicle can be stopped by actuating the hydraulic brake even without the driver operating the brake operation member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle brake system according to an embodiment of the present disclosure will be described in detail below with reference to the drawings. The present vehicle brake system can be referred to as a "drive assist system". Further, the present vehicle brake system can be mounted on a vehicle including a drive source provided with an electric motor, mounted on a vehicle including an engine as a drive source, etc.

Embodiment

Figure 1:
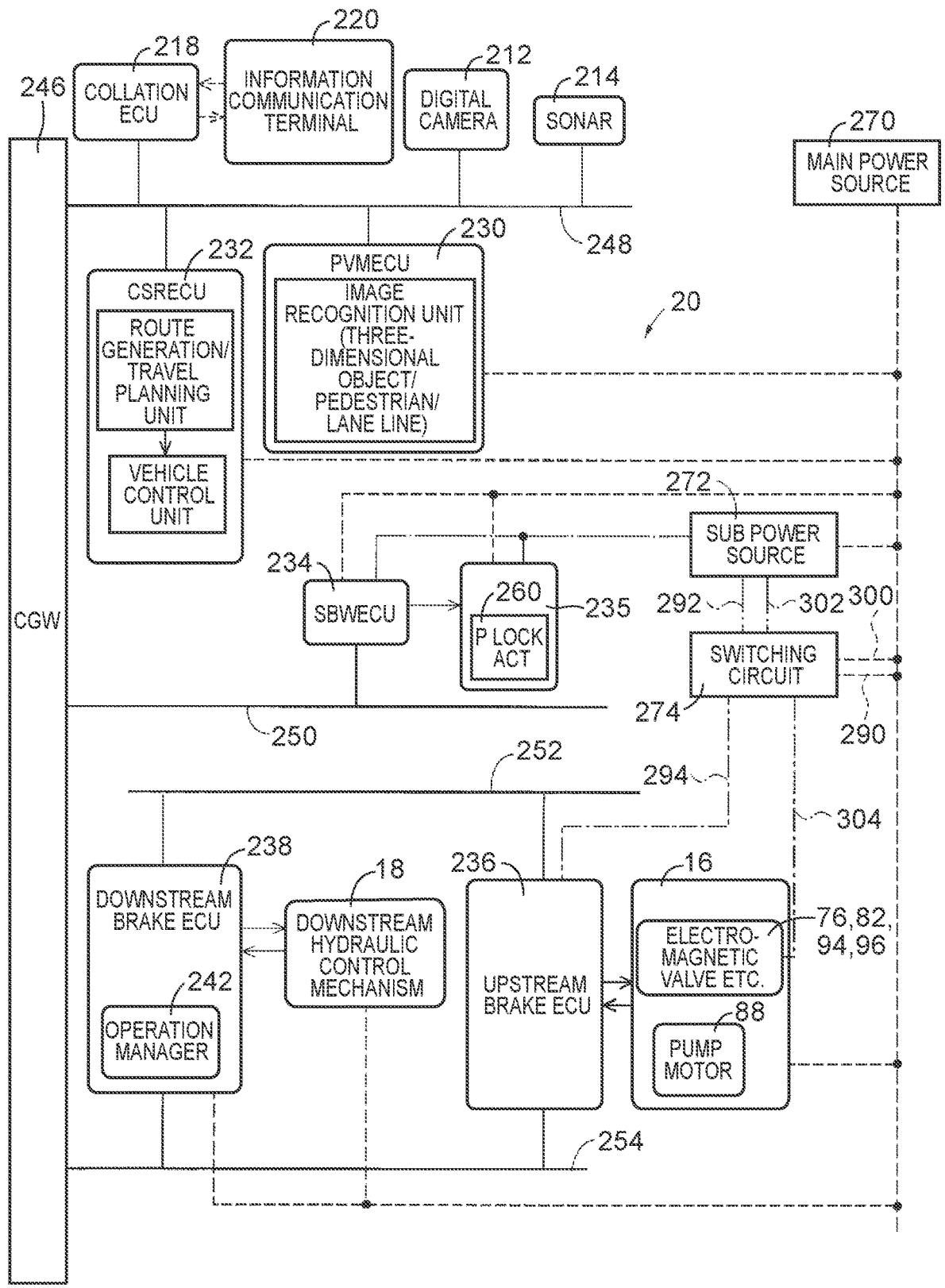
FIG. 1 conceptually illustrates the periphery of a control device for a vehicle brake system according to an embodiment of the present disclosure.
Figure 2:
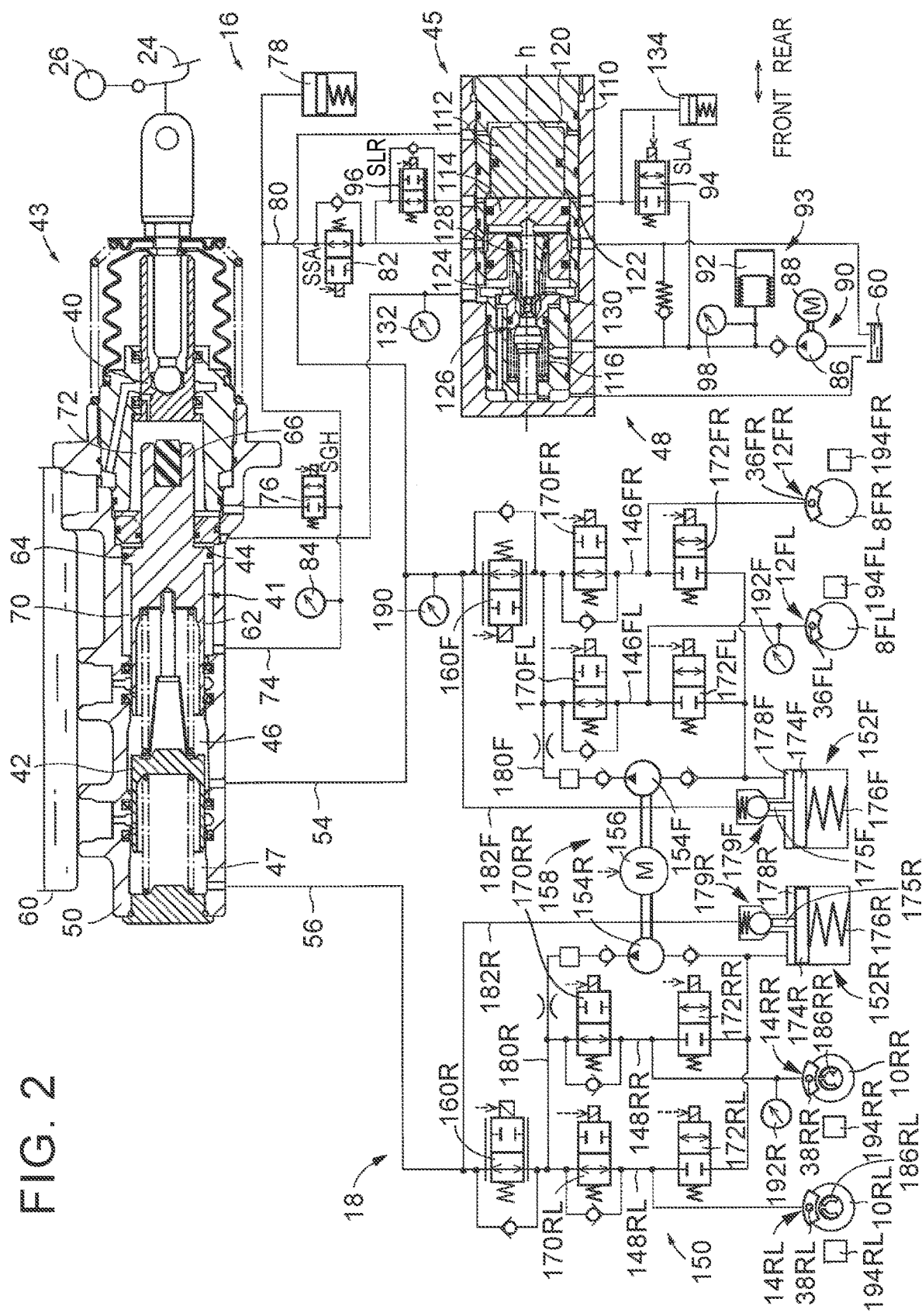
FIG. 2 is a circuit diagram of the vehicle brake system.

As illustrated in FIG. 2, the vehicle brake system according to the present embodiment includes hydraulic brakes 12FR, 12FL provided for right and left front wheels 8FR, 8FL, respectively, and hydraulic brakes 14RR, 14RL provided for right and left rear wheels 10RR, 10RL, respectively, and includes an upstream hydraulic control mechanism 16 and a downstream hydraulic control mechanism 18, each of which serves as a hydraulic pressure supply device, and a control device 20 (see FIG. 1) mainly composed of a computer.

As illustrated in FIG. 2, the upstream hydraulic control mechanism 16 includes (a) a master cylinder 43 that includes an input piston 40, which operates in conjunction with a brake pedal 24 which serves as a brake operation member that is operated by a driver, and two pressurizing pistons 41, 42, and (b) a back-surface hydraulic pressure control device 48 that includes a regulator 45 connected to a back-surface chamber 44 provided in rear of the pressurizing piston 41 of the master cylinder 43, etc. The upstream hydraulic control mechanism 16 controls the hydraulic pressure in the back-surface chamber 44 using the back-surface hydraulic pressure control device 48 to control the hydraulic pressure in pressurizing chambers 46, 47 provided in front of the pressurizing pistons 41, 42, respectively.

In the master cylinder 43, the pressurizing pistons 41, 42 and the input piston 40 are fitted in a housing 50 in series with each other in a liquid-tight and slidable manner, and wheel cylinders 36 for the hydraulic brakes 12 for the right and left front wheels 8, wheel cylinders 38 for the hydraulic brakes 14 for the right and left rear wheels 10, etc. are connected to the pressurizing chambers 46, 47, which are provided in front of the pressurizing pistons 41, 42, via liquid passages 54, 56, respectively. The pressurizing pistons 41, 42 are biased in the retracting direction by a return spring. The pressurizing chambers 46, 47 are communicated with a master reservoir 60 with the pressurizing pistons 41, 42 at the retracting end positions.

In the master cylinder 43, the pressurizing piston 41 is formed in a generally stepped shape, and includes (a) a front piston portion 62 provided at the front part, (b) an intermediate piston portion 64 provided at the intermediate part to project in the radial direction, and (c) a rear small-diameter portion 66 that is provided at the rear part and that is smaller in diameter than the intermediate piston portion 64. The front piston portion 62, the intermediate piston portion 64, and the rear small-diameter portion 66 are fitted in the housing 50 in a liquid-tight and slidable manner. A space in front of the front piston portion 62 is defined as the pressurizing chamber 46. A space in front of the intermediate piston portion 64 is defined as an annular chamber 70. A chamber formed in rear of the intermediate piston portion 64 by the housing 50, the rear small-diameter portion 66, and the intermediate piston portion 64 is defined as the back-surface chamber 44.

The input piston 40 is positioned in rear of the pressurizing piston 41. A space between the rear small-diameter portion 66 and the input piston 40 is defined as an input chamber 72. The brake pedal 24 is connected to the rear part of the input piston 40 via an operating rod (hereinafter occasionally referred to simply as a "rod") etc.

The annular chamber 70 and the input chamber 72 are connected to each other through a coupling passage 74. The coupling passage 74 is provided with an input chamber shut-off valve 76. The input chamber shut-off valve (indicated as "SGH" in the drawing) 76 is a normally closed electromagnetic on/off valve. A portion of the coupling passage 74 on the side of the annular chamber 70 with respect to the input chamber shut-off valve 76 is connected to a stroke simulator 78, and connected to the master reservoir 60 via a reservoir passage 80. The reservoir passage 80 is provided with a reservoir communication valve (indicated as "SSA" in the drawing) 82 which is a normally open electromagnetic on/off valve.

When a current supplied to the solenoid of the input chamber shut-off valve 76 is zero and the input chamber shut-off valve 76 is closed, the input chamber 72 is shut off from both the stroke simulator 78 and the master reservoir 60.

When a current supplied to the solenoid of the reservoir communication valve 82 is zero and the reservoir communication valve 82 is open, the input chamber 72 and the annular chamber 70 are communicated with the stroke simulator 78, and communicated with the master reservoir 60. Therefore, the hydraulic pressure in the input chamber 72 and the annular chamber 70 is discharged to the master reservoir 60, and the stroke simulator 78 is inactivated. Therefore, the reservoir communication valve 82 can be referred to as a "simulator control valve".

A hydraulic pressure sensor 84 is provided in a portion of the coupling passage 74 on the side of the annular chamber 70 with respect to the input chamber shut-off valve 76. The hydraulic pressure sensor 84 detects the hydraulic pressure in the annular chamber 70 and the input chamber 72 when the annular chamber 70 and the input chamber 72 are communicated with each other and shut off from the master reservoir 60. The hydraulic pressure in the annular chamber 70 and the input chamber 72 matches the operating force of the brake pedal 24. Therefore, the hydraulic pressure sensor 84 can be referred to as an "operating hydraulic pressure sensor".

Further, the stroke, which is the amount of advancement of the brake pedal 24 from the retracted end position of the brake pedal 24, is detected by a stroke sensor 26.

The back-surface hydraulic pressure control device 48 includes a high-pressure source 93, a hydraulic pressure control valve device, etc., in addition to the regulator 45. The high-pressure source 93 includes a pump device 90 that includes a pump 86 and a pump motor 88, an accumulator 92, etc. The hydraulic pressure control valve device includes electromagnetic valves that control the hydraulic pressure in a control chamber 122 to be discussed later. The electromagnetic valves include a pressure increasing linear valve (SLA) 94, a pressure decreasing linear valve (SLR) 96, etc.

The accumulator 92 stores working oil discharged from the pump device 90 in a pressurized state. The accumulator pressure, which is the hydraulic pressure of the working oil accommodated in the accumulator 92, is detected by an accumulator pressure sensor 98. While the pump motor 88 is normally controlled such that the accumulator pressure detected by the accumulator pressure sensor 98 is kept within a set range, the pump motor 88 is controlled such that the accumulator pressure is equal to or more than a set pressure before remote parking control is performed as discussed later. The set pressure may be a hydraulic pressure required to stop the vehicle one or more times, for example.

The regulator 45 includes (d) a housing 110 and (e) a pilot piston 112 and a control piston 114 provided in the housing 110 side by side in series with each other in a direction that is parallel to an axis h. A high-pressure chamber 116 is formed in the housing 110 in front of the control piston 114, and connected to the high-pressure source 93. A space between the pilot piston 112 and the housing 110 is defined as a pilot pressure chamber 120. A space in rear of the control piston 114 is defined as a control chamber 122. A servo chamber 124 which serves as an output chamber is provided in front of the control piston 114. A high-pressure supply valve 126 is provided between the servo chamber 124 and the high-pressure chamber 116. The high-pressure supply valve 126 is a normally closed valve, and shuts off the servo chamber 124 and the high-pressure chamber 116 from each other when the regulator 45 is inactivated. The control piston 114 is biased in the retracting direction by a return spring 130.

A low-pressure passage 128 passes through the inside of the control piston 114 to be communicated with the master reservoir 60 at all times. The low-pressure passage 128 opens in the front end portion of the control piston 114 so that the opening of the low-pressure passage 128 faces the high-pressure supply valve 126. Therefore, when the control piston 114 is located at the retracted end, the servo chamber 124 is shut off from the high-pressure chamber 116, and communicated with the master reservoir 60 via the low-pressure passage 128. When the control piston 114 is advanced and the opening is blocked, the servo chamber 124 is shut off from the master reservoir 60, and the high-pressure supply valve 126 is opened to be communicated with the high-pressure chamber 116.

The pressurizing chamber 46 is connected to the pilot pressure chamber 120. The pilot pressure chamber 120 and the pressurizing chamber 46 communicate with each other at all times. Therefore, the hydraulic pressure in the pressurizing chamber 46 acts on the pilot piston 112 at all times. The back-surface chamber 44 is connected to the servo chamber 124. The servo chamber 124 and the back-surface chamber 44 communicate with each other at all times. Therefore, a servo pressure Ps, which is the hydraulic pressure in the servo chamber 124, and the hydraulic pressure in the back-surface chamber 44 are principally equal to each other. The servo pressure Ps, which is the hydraulic pressure in the servo chamber 124, is detected by a servo pressure sensor 132.

The pressure increasing linear valve (SLA) 94 is provided between the high-pressure source 93 and the control chamber 122. The pressure decreasing linear valve (SLR) 96 is provided between the master reservoir 60 and the control chamber 122. The pressure increasing linear valve 94 is a normally closed valve, which is closed when a current supplied to its solenoid is zero. When a large current is supplied, the pressure increasing linear valve 94 opens to a large degree, which reduces the pressure difference between the hydraulic pressure in the high-pressure source 93 and the hydraulic pressure in the control chamber 122. The pressure decreasing linear valve 96 is a normally open valve, which is open when a current supplied to its solenoid is zero. When a large current is supplied, the pressure decreasing linear valve 96 opens to a small degree, which increases the pressure difference between the hydraulic pressure in the control chamber 122 and the hydraulic pressure in the master reservoir 60. The hydraulic pressure in the control chamber 122 is controlled by controlling the current supplied to the solenoid of the pressure increasing linear valve 94 and the current supplied to the solenoid of the pressure decreasing linear valve 96. A damper 134 is connected to the control chamber 122 so that working oil is exchanged between the control chamber 122 and the damper 134.

In the present embodiment, the relationship between the hydraulic pressure in the control chamber 122 and the servo pressure Ps in the servo chamber 124 in the regulator 45 is determined based on the structure of the regulator 45, and the relationship between the hydraulic pressure in the back-surface chamber 44 and the hydraulic pressure in the pressurizing chambers 46, 47 in the master cylinder 43 is determined based on the structure of the master cylinder 43, and is known. Therefore, the hydraulic pressure in the control chamber 122 can be controlled such that the hydraulic pressure in the pressurizing chambers 46, 47 is brought closer to a target hydraulic pressure. The regulator 45 and the master cylinder 43 can be designed such that the hydraulic pressure in the control chamber 122, the servo pressure Ps in the servo chamber 124, and the hydraulic pressure in the pressurizing chambers 46, 47 are equal to each other.

The downstream hydraulic control mechanism 18 includes (a) a slip control valve device 150, (b) a pump device 158 that includes pumps 154F, 154R and a pump motor 156 that suction working oil in pressure decreasing reservoirs 152F, 152R and discharge the working oil to an upstream portion of the slip control valve device 150, (c) normally open hydraulic control valves 160F, 160R provided between the pumps 154F, 154R and the pressurizing chambers 46, 47 of the master cylinder 43, etc. The hydraulic control valves 160F, 160R control the hydraulic pressure in the wheel cylinders 36FR, 36FL, 38RR, 38RL of the hydraulic brakes 12FR, 12FL, 14RR, 14RL with respect to the hydraulic pressure in the pressurizing chambers 46, 47 of the master cylinder 43.

The downstream hydraulic control mechanism 18 has two, front and rear, systems. In the system on the side of the front wheels, individual passages 146FR, 146FL, which are connected to the wheel cylinders 36FR, 36FL of the right and left front wheels 8FR, 8FL, respectively, are connected to the liquid passage 54. Holding valves 170FR, 170FL are provided in the individual passages 146FR, 146FL, respectively. The wheel cylinders 36FR, 36FL and the liquid chamber 178F of the pressure decreasing reservoir 152F are connected to each other through respective pressure decreasing passages, which are provided with pressure decreasing valves 172FR, 172FL, respectively.

In the system on the side of the rear wheels, individual passages 148RR, 148RL, which are connected to the wheel cylinders 38RR, 38RL, respectively, are connected to the liquid passage 56. Holding valves 170RR, 170RL are provided in the individual passages 148RR, 148RL, respectively. Pressure decreasing valves 172RR, 172RL are provided between the wheel cylinders 38RR, 38RL and the liquid chamber 178R of the pressure decreasing reservoir 152R, respectively. The slip control valve device 150 is composed of the holding valves 170, the pressure decreasing valves 172, the pressure decreasing reservoirs 152, etc.

The system on the side of the front wheels will be described below, and description of the system on the side of the rear wheels will be omitted. The pressure decreasing reservoir 152F includes a housing, a partitioning member 174F slidably fitted in the housing, and an elastic member 176F provided in the housing on one side of the partitioning member 174F. A liquid chamber 178F is defined in the housing on the opposite side of the partitioning member 174F from the side on which the elastic member 176F is provided. Working oil is accommodated in the liquid chamber 178F.

A supplementary valve 179F is provided for the liquid chamber 178F. The supplementary valve 179F includes a valve seat, a valve element, a spring that applies an elastic force in the direction of pressing the valve element against the valve seat, and a valve opening member 175F provided on the partitioning member 174F. When the amount of working oil accommodated in the liquid chamber 178F is equal to or more than a set amount in the pressure decreasing reservoir 152F, the supplementary valve 179F is closed with the valve element seated on the valve seat. When the amount of working oil accommodated in the liquid chamber 178F is less than the set amount, the partitioning member 174F is moved by the elastic force of the spring 176F, and the supplementary valve 179F is switched to be open with the valve element moved away from the valve seat by the valve opening member 175F.

The liquid chamber 178F of the pressure decreasing reservoir 152F and a portion of the liquid passage 54 upstream of a connection portion of the individual passages 146FR, 146FL (a portion upstream of the holding valves 170FR, 170FL) are connected to each other through a pump passage 180F. The pump passage 180F is provided with a pump 154F. A damper, an orifice, etc. is provided in a portion of the pump passage 180F on the discharge side of the pump 154F to suppress pulsation of working oil discharged from the pump 154F. The suction side of the pump 154F is connected to the liquid chamber 178F of the pressure decreasing reservoir 152F via a suction valve.

The hydraulic control valve 160F is provided in a portion of the liquid passage 54 upstream of a connection portion of the pump passage 180F. A portion of the liquid passage 54 upstream of the hydraulic control valve 160F and the pressure decreasing reservoir 152F are connected to each other through a supplementary passage 182F via the supplementary valve 179F.

The hydraulic control valve 160F controls a pressure difference dP between the hydraulic pressure in a portion upstream of the hydraulic control valve 160F and the hydraulic pressure in a portion downstream thereof to a magnitude that matches a current supplied to the hydraulic control valve 160F. When the current supplied to the hydraulic control valve 160F becomes larger, the pressure difference dP becomes larger, and the hydraulic pressure in the wheel cylinder 36 becomes higher with respect to the hydraulic pressure in the pressurizing chamber 46 of the master cylinder 43.

The right and left rear wheels 10 are each provided with an electric parking brake 186, which is actuated by an electric actuator (not illustrated). The actuation state of the electric parking brake 186 is held even if a current supplied to the electric actuator becomes zero.

In the present embodiment, the liquid passage 54 is provided with a master cylinder pressure sensor 190, and the individual passages 146FL, 148RR are provided with wheel cylinder pressure sensors 192F, 192R, respectively. The master cylinder pressure sensor 190 detects the hydraulic pressure in the pressurizing chamber 46. Since the hydraulic pressures in the pressurizing chambers 46, 47 are estimated to be substantially equal to each other, the hydraulic pressure in the pressurizing chamber 47 can be estimated based on a value detected by the master cylinder pressure sensor 190. The wheel cylinder pressure sensors 192F, 192R detect the respective hydraulic pressures in the wheel cylinders 36FL, 38RR. When the hydraulic pressures in the wheel cylinders 36FR, 36FL are substantially equal to each other on the side of the front wheels, or when the hydraulic pressures in the wheel cylinders 38RR, 38RL are substantially equal to each other on the side of the rear wheels, one of the hydraulic pressures can be estimated by detecting the other.

A wheel speed sensor 194 that detects the rotational speed of a wheel is provided for each of the right and left front wheels 8 and the right and left rear wheels 10. The travel speed of the vehicle is acquired based on a value detected by each of the wheel speed sensors 194.

As illustrated in FIG. 1, the control device 20 includes a plurality of electronic control units (ECUs) 230, 232, 234, 236, 238, etc., which is mainly composed of a computer. The ECUs 230 to 238 etc. are communicably connected to each other via a central gate way (CGW) 246, buses 248 to 254, etc. A digital camera 212, a sonar 214, etc. are connected to the bus 248 so that image information obtained through the digital camera 212 and information obtained through the sonar 214 can be supplied to the ECUs 230, 232, etc.

The digital camera 212 and the sonar 214 are provided at a plurality of portions of the vehicle.

A collation ECU 218 is connected to the control device 20. The collation ECU 218 communicates information with an information communication terminal 220, which is located outside the vehicle, to collate an identifier (ID) of the information communication terminal 220 and acquire remote information which is information supplied from the information communication terminal 220. The remote information is supplied to the control device 20 by way of the collation ECU 218. Automatic parking control performed based on the remote information is referred to as "remote parking control". The remote parking control is performed by the driver operating the information communication terminal 220 from the outside of the vehicle, and therefore normally performed when the driver etc. is not on the vehicle. However, a person other than the operator of the information communication terminal 220 is occasionally on the vehicle and performs a drive operation (e.g. an operation of the brake pedal 24).

The ECU 230 is a panoramic view monitor (PVM) ECU 230. The PVM ECU 230 includes an image recognition unit that recognizes a three-dimensional object, a person, a lane line, etc. around the vehicle, and prepares a panoramic image based on images captured by the plurality of digital cameras 212 etc., for example.

The ECU 232 is a clearance sonar (CSR) ECU 232. The CSR ECU 232 includes a route generation/travel planning unit, a vehicle control unit, etc. The route generation/travel planning unit performs image recognition based on information that represents panoramic images supplied from the PVM ECU 230, information from the sonars 214, etc., prepares a bird's-eye view image, and prepares a route and a travel plan for the vehicle for moving the vehicle to a target parking position. The vehicle control unit prepares a control command value for the vehicle brake system etc. based on the route, the travel plan, etc. prepared by the route generation/travel planning unit, and outputs the control command value to the operation manager 242.

The ECU 234 is a shift-by-wire (SBW) ECU 234. The SBW ECU 234 can switch the shift position without an operation by the driver, and switches the shift position among a parking position, a reverse position, etc. by controlling actuators. In addition, the SBW ECU 234 actuates a parking lock mechanism 235 when the shift position is switched to the parking position.

The parking lock mechanism 235 locks rotation of a drive transfer shaft (which may be an output shaft of an automatic transmission, an output shaft of a speed reduction mechanism, etc. for example) (not illustrated) that transfers an output of a drive source for driving the vehicle to drive wheels (e.g. the right and left front wheels 8FR, 8FL). The parking lock mechanism 235 includes a parking lock (P lock) actuator (ACT) 260, and locks rotation of the drive transfer shaft with an engagement member (not illustrated) engaged with a parking lock gear, which is provided so as to be rotatable together with the drive transfer shaft, by means of the parking lock ACT 260. Consequently, rotation of the drive wheels 8FR, 8FL is hindered. In the present embodiment, the parking lock mechanism 235 is considered as a constituent element of the vehicle brake system.

The ECU 236 is an upstream brake ECU 236. The upstream hydraulic control mechanism 16 is connected to the upstream brake ECU 236. Values detected by the plurality of sensors such as the stroke sensor 26 and the servo pressure sensor 132, which is included in the upstream hydraulic control mechanism 16, are supplied from the upstream hydraulic control mechanism 16 to the upstream brake ECU 236. Control command values for electromagnetic valves such as the input chamber shut-off valve 76, the reservoir communication valve 82, the pressure increasing linear valve 94, and the pressure decreasing linear valve 96 and the pump motor 88 are output from the upstream brake ECU 236 to the upstream hydraulic control mechanism 16.

The ECU 238 is a downstream brake ECU 238. The downstream hydraulic control mechanism 18 is connected to the downstream brake ECU 238. Values detected by the plurality of sensors such as the master cylinder pressure sensor 190, which is included in the downstream hydraulic control mechanism 18, are supplied from the downstream hydraulic control mechanism 18 to the downstream brake ECU 238. Control command values for the pump motor 156 and electromagnetic valves such as the hydraulic control valves 160 and the holding valves 170 are output from the downstream brake ECU 238.

The operation manager 242 is included in the downstream brake ECU 238. The operation manager 242 controls the downstream hydraulic control mechanism 18 based on control command values supplied from the vehicle control unit of the CSR ECU 232, and supplies the control command values etc. to the upstream brake ECU 236 etc. The upstream brake ECU 236 controls the upstream hydraulic control mechanism 16 based on the control command values.

The operation manager 242 also supplies the control command values supplied from the CSR ECU 232 to a hybrid vehicle/electronic fuel injection (HV/EFI) ECU, an electronic controlled power steer (EPS) ECU (not illustrated), etc. Control by the HV/EFI ECU, the EPS ECU, etc. is not described.

A main power source 270 which serves as a first power source and a sub power source 272 which serves as a second power source are connected to the vehicle brake system etc. The main power source 270 stores electric energy (e.g. electric energy generated through operation of a regenerative brake) generated during travel of the vehicle. The sub power source 272 stores electric energy supplied from the main power source 270 at a reduced voltage. The main power source 270 and the sub power source 272 may be a lithium ion battery etc., for example. The charging capacity of the sub power source 272 is smaller than the charging capacity of the main power source 270.

The main power source 270 is connected to the CSR ECU 232, the PVM ECU 230, the downstream brake ECU 238, and the downstream hydraulic control mechanism 18. The main power source 270 and the sub power source 272 are connected to the upstream brake ECU 236 and the upstream hydraulic control mechanism 16. Specifically, the main power source 270 is connected to the pump motor 88, and the main power source 270 and the sub power source 272 are connected via a switching circuit 274 to the solenoids of electromagnetic valves such as the input chamber shut-off valve 76, the reservoir communication valve 82, the pressure increasing linear valve 94, and the pressure decreasing linear valve 96, sensors such as the stroke sensor 26, the accumulator pressure sensor 98, the hydraulic pressure sensor 84, and the servo pressure sensor 132, and the upstream brake ECU 236. The main power source 270 and the sub power source 272 are connected to the SBW ECU 234 and the parking lock mechanism 235 so that power is supplied from one of the main power source 270 and the sub power source 272 at a higher voltage.

Figure 3:
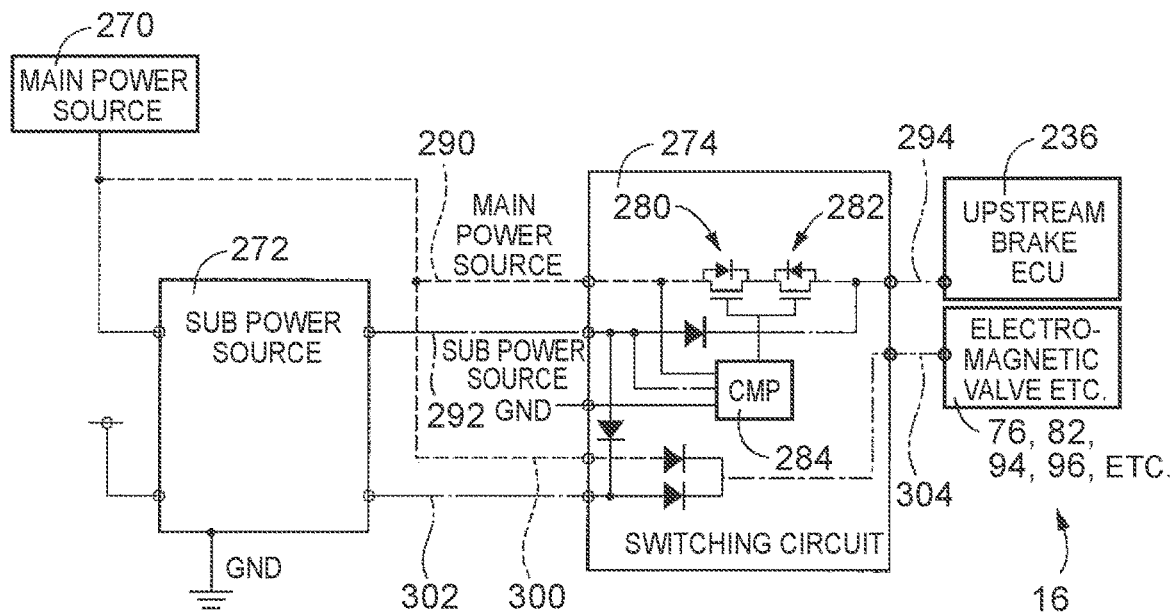
FIG. 3 conceptually illustrates the structure of a switching circuit for the vehicle brake system.

As illustrated in FIG. 3, the switching circuit 274 is provided between the main power source 270, the sub power source 272, the upstream brake ECU 236, and the upstream hydraulic control mechanism 16. The switching circuit 274 includes two semiconductor switch elements 280, 282 and an element 284. The two semiconductor switch elements 280, 282 are provided in a power line 290 from the main power source 270. A power line 292 from the sub power source 272 is connected to a portion of the power line 290 downstream of the two semiconductor switch elements 280, 282. The switching circuit 274 is connected to the upstream brake ECU 236 via a power line 294.

On the other hand, a power line 300 from the main power source 270 and a power line 302 from the sub power source 272 are connected to the switching circuit 274, and one of these at a higher voltage is connected to the solenoids of the electromagnetic valves of the upstream hydraulic control mechanism 16, the sensors, etc. discussed above via a power line 304.

The element 284 detects the voltage of the main power source 270 and the voltage of the sub power source 272, compares the voltages, and supplies power from the power line 290 to the respective bases of the two semiconductor switch elements 280, 282 based on the comparison result. When the voltage of the main power source 270 is higher than the voltage of the sub power source 272, a voltage is applied to the bases of the semiconductor switch elements 280, 282. Consequently, the power line 290 can be energized, which allows power supply from the main power source 270 to the upstream brake ECU 236 by way of the power lines 290, 294. When the voltage of the sub power source 272 is higher than the voltage of the main power source 270, no voltage is applied to the bases of the semiconductor switch elements 280, 282. As a result, the power line 290 cannot be energized, and power from the main power source 270 is not supplied to the upstream brake ECU etc. by way of the power line 290, and power from the sub power source 272 is supplied to the upstream brake ECU etc. by way of the power lines 292, 294.

In the present embodiment, the element 284 can be considered as a switch control unit that includes a detection unit that detects the voltages of the main power source 270 and the sub power source 272 and that controls the semiconductor switch elements 280, 282.

In the vehicle brake system configured as described above, the remote parking control is performed as the drive assist control. In the remote parking control, the vehicle is moved to a target parking position and stopped based on an operation of the information communication terminal 220 which is located outside the vehicle, even if the driver is not on the vehicle. In the remote parking control, image recognition is performed based on the captured images acquired by the digital cameras 212 provided in the vehicle, the information supplied from the sonars 214, etc., a route for the vehicle for moving the vehicle to the target parking position is prepared, and a travel plan is prepared. In addition, control command values are prepared based on the prepared travel plan, and supplied to the operation manager 242. The operation manager 242 supplies the control command values to the upstream brake ECU 236 etc.

The upstream brake ECU 236 controls the upstream hydraulic control mechanism 16 based on the control command values (such as requests for actuation of the hydraulic brakes 12, 14 and a target hydraulic pressure, for example). Currents supplied to the pressure increasing linear valve 94, the pressure decreasing linear valve 96, etc. are controlled such that the actual hydraulic pressure in the hydraulic brakes 12, 14 is brought closer to the target hydraulic pressure. When the vehicle has reached the target parking position, the operation manager 242 actuates the parking brake 186 by controlling the electric actuator.

When the vehicle has reached the target parking position, the operation manager 242 may actuate the parking lock mechanism 235, in addition to or in place of the parking brake 186.

In the upstream hydraulic control mechanism 16, in principle, a current that is larger than zero is supplied to the solenoids of the input chamber shut-off valve 76 and the reservoir communication valve 82 while the main switch of the vehicle is turned ON. The input chamber 72 and the annular chamber 76 are communicated with each other and shut off from the master reservoir 60, and communicated with the stroke simulator 78.

In the back-surface hydraulic pressure control device 48, the hydraulic pressure in the control chamber 122 is controlled by controlling the pressure increasing linear valve 94 and the pressure decreasing linear valve 96. The control piston 114 is advanced, and a servo pressure is generated in the servo chamber 124, and supplied to the back-surface chamber 44. The hydraulic pressure in the back-surface chamber 44 advances the pressurizing piston 41, which advances the pressurizing piston 42. Consequently, hydraulic pressures are generated in the pressurizing chambers 46, 47. When the pressurizing chambers 46, 47 and the wheel cylinders 36, 38 are communicated with each other, the hydraulic pressures in the pressurizing chambers 46, 47 are supplied to the wheel cylinders 36, 38 to actuate the hydraulic brakes 12, 14, respectively. The hydraulic pressures in the wheel cylinders 36, 38 are substantially equal to the hydraulic pressures in the pressurizing chambers 46, 47.

Figure 4:
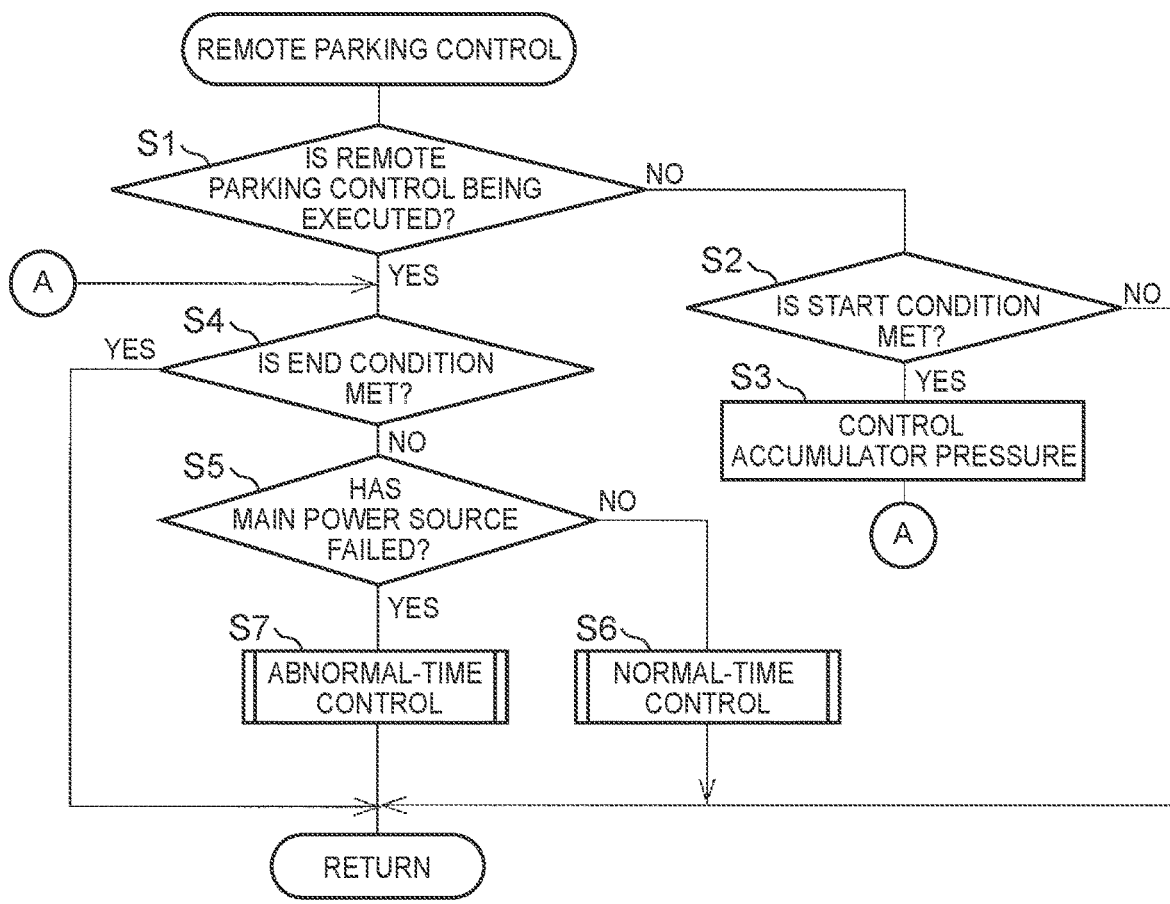
FIG. 4 is a flowchart conceptually illustrating a remote parking control program stored in a storage unit of the control device.

The remote parking control is controlled in accordance with the flowchart in FIG. 4. It is determined in step 1 (hereinafter abbreviated as "S1"; the same also applies to the other steps) whether the remote parking control is being executed. When the determination is NO, it is determined in S2 whether a start condition is met. The start condition may include a condition as to whether remote information for starting remote parking is supplied via the collation ECU 218, for example. When the determination in S2 is NO, S1 and S2 are repeatedly executed.

When the determination in S2 becomes YES in the meantime, the pump motor 88 is actuated in S3, and a hydraulic pressure that is equal to or more than the set pressure is stored in the accumulator 92.

After that, it is determined in S4 whether an end condition is met. It is determined that the end condition is met when the target position is reached and the parking brake 186 and the parking lock mechanism 235 are actuated. When the determination is NO, it is determined in S5 whether the voltage of the main power source 270 is lower than the voltage of the sub power source 272, or in other words whether the main power source 270 has failed. In the present embodiment, the voltage of the sub power source 272 corresponds to the set voltage. When the determination in S5 is NO, normal-time control is performed in S6. When the determination in S5 is YES, abnormal-time control is performed in S7.

The normal-time control in S6 is performed with power supplied from the main power source 270 to the vehicle brake system. To stop the vehicle in the remote parking control, a target hydraulic pressure which is a target value for the hydraulic pressures in the wheel cylinders 36, 38 is determined so as to have a magnitude that may stop the vehicle, and the pressure increasing linear valve 94 and the pressure decreasing linear valve 96 are controlled such that the actual hydraulic pressure, which is a value detected by the wheel cylinder pressure sensor 192, is brought closer to the target hydraulic pressure.

In the abnormal-time control in S7, the vehicle is immediately stopped with power supplied from the sub power source 272 to the vehicle brake system. The power from the sub power source 272 is not supplied to the downstream brake ECU 238 etc., but supplied to the upstream brake ECU 236, the upstream hydraulic control mechanism 18, the SBW ECU 234, the parking lock mechanism 235, etc. Since power is not supplied from the sub power source 272 to the pump motor 88, a hydraulic pressure cannot be stored in the accumulator 92, even if the main power source 270 fails during the remote parking control. Therefore, in S3, the hydraulic pressure in the accumulator 92 is raised to be higher than the set pressure through actuation of the pump motor 88 before the start of the remote parking control.

Since power from the sub power source 272 is used in this manner, it is necessary to suppress power consumption. In the abnormal-time control, currents are mainly consumed by the solenoids of electromagnetic valves such as the input chamber shut-off valve 76, the reservoir communication valve 82, the pressure increasing linear valve 94, and the pressure decreasing linear valve 96. Thus, in the present embodiment, currents supplied to the pressure increasing linear valve 94 and the pressure decreasing linear valve 96 are controlled with currents supplied to the solenoids of the input chamber shut-off valve 76 and the reservoir communication valve 82 brought to zero.

When the input chamber shut-off valve 76 is closed, the input chamber 72 is shut off from the stroke simulator 78. In the remote parking control, however, the brake pedal 24 is not often operated. When the reservoir communication valve 82 is open, meanwhile, the annular chamber 70 is communicated with the master reservoir 60. Therefore, even if the brake pedal 24 is operated, the pressurizing pistons 41, 42 are allowed to be advanced to generate hydraulic pressures in the pressurizing chambers 46, 47. Therefore, the driver does not feel uncomfortable.

A current I (SLA) supplied to the solenoid of the pressure increasing linear valve 94 and a current I (SLR) supplied to the solenoid of the pressure decreasing linear valve 96 are controlled within such a range that the sum I (SLA)+I (SLR) of these currents does not exceed a limit current value X.

$$I(SLA)+I(SLR)<X$$

The limit current value X is a current value that can be used by the pressure increasing linear valve 94 and the pressure decreasing linear valve 96. The limit current value X may be determined based on the voltage of the sub power source 272, the capacity of the sub power source 272, the values of currents consumed by constituent elements actuated by power from the sub power source 272 (such as the SBW ECU 234, the parking lock mechanism 235, the upstream brake ECU 236, the solenoids of the electromagnetic valves, and the sensors, for example), a margin value, etc. The limit current value X may be a set value (constant) determined in advance.

The parking lock ACT 260 is actuated to lock the drive transfer shaft under control by the SBW ECU 234. Control for the parking lock ACT 260 is performed separately from control for the hydraulic brakes 12, 14. The drive transfer shaft is locked while the time that has elapsed since the voltage of the main power source 270 became lower than the set voltage is shorter than T2.

Figure 5:
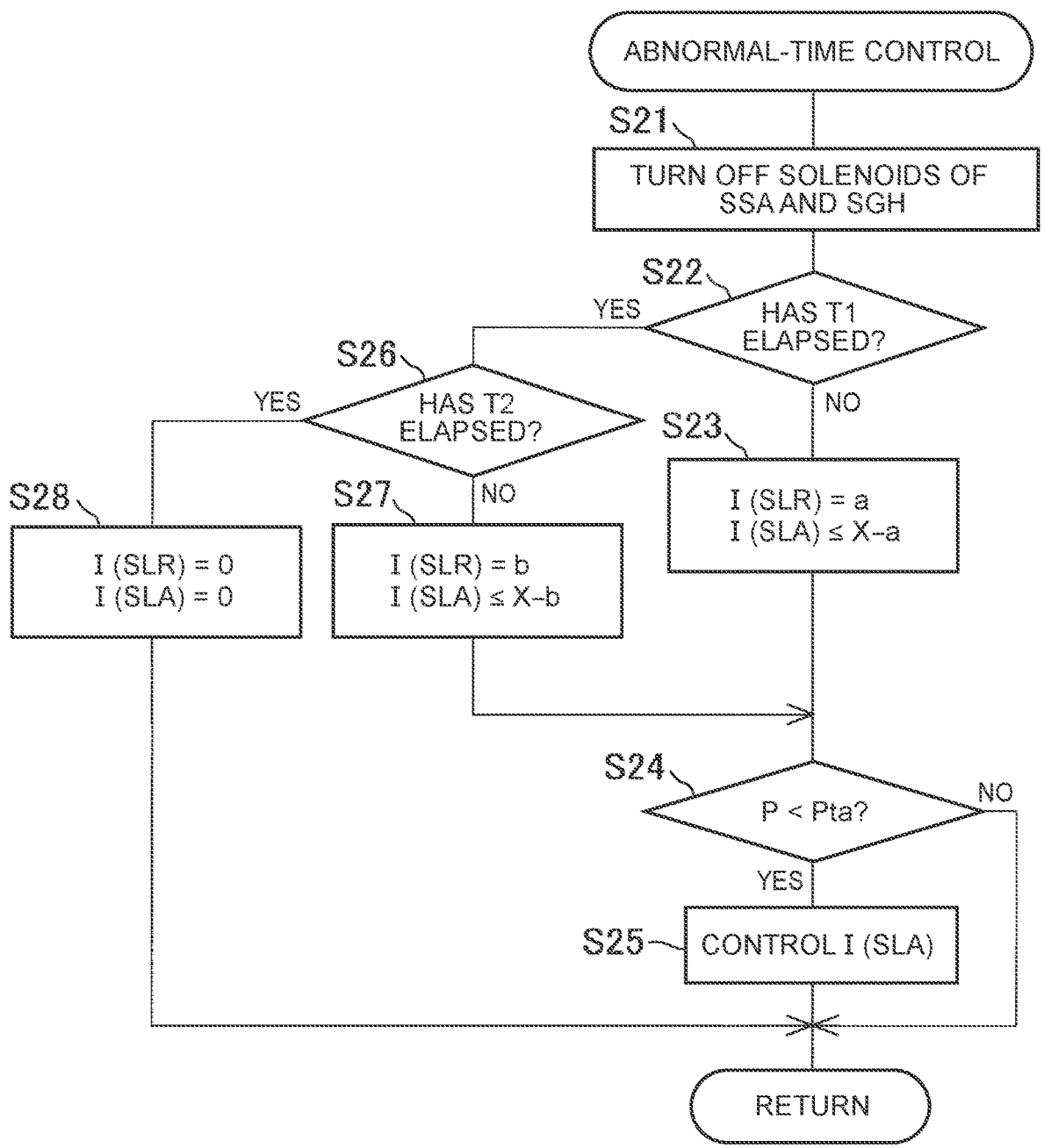
FIG. 5 is a flowchart conceptually illustrating a part (abnormal-time control) of a drive assist control program.

The abnormal-time control will be described with reference to the flowchart in FIG. 5. In S21, currents supplied to the solenoids of the input chamber shut-off valve 76 and the reservoir communication valve 82 are brought to zero. In S22, it is determined whether the time that has elapsed since the failure of the main power source 270 was detected has exceeded time T1. When the determination is NO, control is performed in S23 such that a current supplied to the pressure decreasing linear valve 96 is brought to a first set current value a and a current supplied to the pressure increasing linear valve 94 is within the range not exceeding a value (X−a) obtained by subtracting the first set current value a, which is the value of a current supplied to the pressure decreasing linear valve 96, from the limit current value X.

The first set current value a may have such a magnitude that a hydraulic pressure does not leak out of the control chamber 122 to the master reservoir 60 via the pressure decreasing linear valve 96 even when the hydraulic pressure in the control chamber 122 is controlled to a level at the time when the brake pedal 24 is operated by the driver with a large operating force. Then, a current supplied to the pressure increasing linear valve 94 is controlled within the range not exceeding (X−a) so that the actual hydraulic pressure, which is the hydraulic pressures in the wheel cylinders 36, 38, is brought closer to a target hydraulic pressure, which is a hydraulic pressure required to stop the vehicle.

The target hydraulic pressure and the actual hydraulic pressure are for the hydraulic pressures in the wheel cylinders 36, 38. The wheel cylinder pressure sensor 192 cannot be used for the abnormal-time control, since the wheel cylinder pressure sensor 192 is a constituent element of the downstream hydraulic control mechanism 18. When no power is supplied to the downstream hydraulic control mechanism 18, the hydraulic pressures in the wheel cylinders 36, 38 are substantially equal to the hydraulic pressures in the pressurizing chambers 46, 47 of the master cylinder 43. Therefore, in the present embodiment, a target hydraulic pressure Pta and an actual hydraulic pressure P are for the hydraulic pressures in the pressurizing chambers 46, 47 of the master cylinder 43.

The target hydraulic pressure Pta is determined so as to have a magnitude that may stop the vehicle, as in the normal-time control, based on the gradient of the road surface, a drive force applied to the vehicle, the vehicle speed, etc. at the time when the remote parking control is performed, for example. In other words, the target hydraulic pressure Pta is not determined based on the operating state of the brake pedal 24, even if the brake pedal 24 is operated by the driver.

The actual hydraulic pressure P can be acquired based on at least one of a hydraulic pressure detected by the servo pressure sensor 132 and a value detected by the stroke sensor 26. The relationship between the hydraulic pressure in the back-surface chamber 44 and the hydraulic pressures in the pressurizing chambers 46, 47 at the time when the brake pedal 24 is located at the retracted end position is known. Therefore, the hydraulic pressures in the pressurizing chambers 46, 47 can be estimated based on the hydraulic pressure detected by the servo pressure sensor 132.

When the brake pedal 24 is operated, the pressurizing pistons 41, 42 are advanced along with the advancement of the brake pedal 24, and hydraulic pressures are generated in the pressurizing chambers 46, 47. Therefore, the hydraulic pressures in the pressurizing chambers 46, 47 due to the operation of the brake pedal 24 can be estimated based on the operation stroke of the brake pedal 24 detected by the stroke sensor 26. In the present embodiment, from the above description, the actual hydraulic pressure P, which is the hydraulic pressures in the pressurizing chambers 46, 47, is acquired based on at least one of the hydraulic pressures in the pressurizing chambers 46, 47 determined in accordance with the hydraulic pressure in the back-surface chamber 44, and the hydraulic pressures in the pressurizing chambers 46, 47 determined in accordance with the stroke of the brake pedal 24.

It is determined in S24 whether the actual hydraulic pressure P is lower than the target hydraulic pressure Pta. When the determination is YES, a current supplied to the pressure increasing linear valve 94 is controlled in S25. When the actual hydraulic pressure is short for the target hydraulic pressure, the current supplied to the pressure increasing linear valve 94 is increased.

When the determination in S22 is YES, on the contrary, it is determined in S26 whether the time that has elapsed since the failure of the main power source 270 was detected has exceeded time T2. When the determination is NO, control is performed in S27 such that a current supplied to the pressure decreasing linear valve 96 is brought to a second set current value b and a current supplied to the pressure increasing linear valve 94 is in the range not exceeding (X−b). The second set current value b is smaller than the first set current value a (b<a). When time T1 has elapsed since the time when the failure of the main power source 270 was detected (when the abnormal-time control was started), it is estimated that the vehicle has been stopped. A braking force required to maintain a vehicle that has been stationary in a stationary state is smaller than a braking force required to stop the vehicle. Therefore, it is considered that the current supplied to the pressure decreasing linear valve 96 may be reduced.

When the determination in S26 is YES, on the contrary, the currents supplied to the pressure increasing linear valve 94 and the pressure decreasing linear valve 96 are brought to zero. This is because it is considered that the parking brake 186 has been actuated and that the vehicle has been stationary well when time T2 has elapsed since the abnormal-time control was started. After that, the determination in S4 becomes YES.

Figure 6:
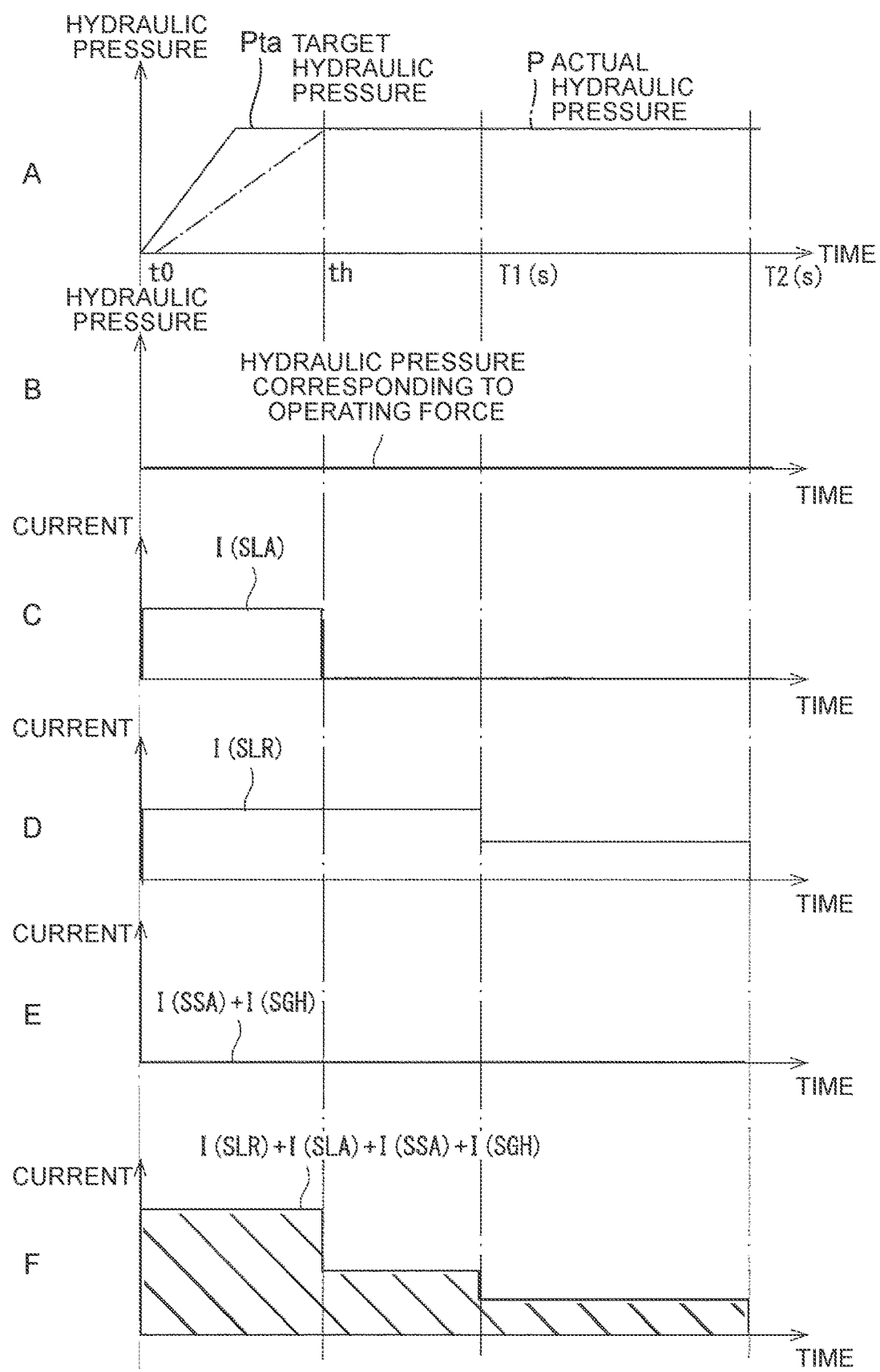
FIG. 6 illustrates an operation state of the vehicle brake system, in which A is a graph indicating variations in the target hydraulic pressure and the actual hydraulic pressure, B is a graph indicating variations in the hydraulic pressure corresponding to an operating force, C is a graph indicating variations in the current to be supplied to a pressure increasing linear valve, D is a graph indicating variations in the current to be supplied to a pressure decreasing linear valve, E is a graph indicating variations in the currents to be supplied to an input chamber shut-off valve and a reservoir communication valve, and F is a graph indicating variations in the current consumed by an upstream hydraulic control mechanism.
Figure 7:
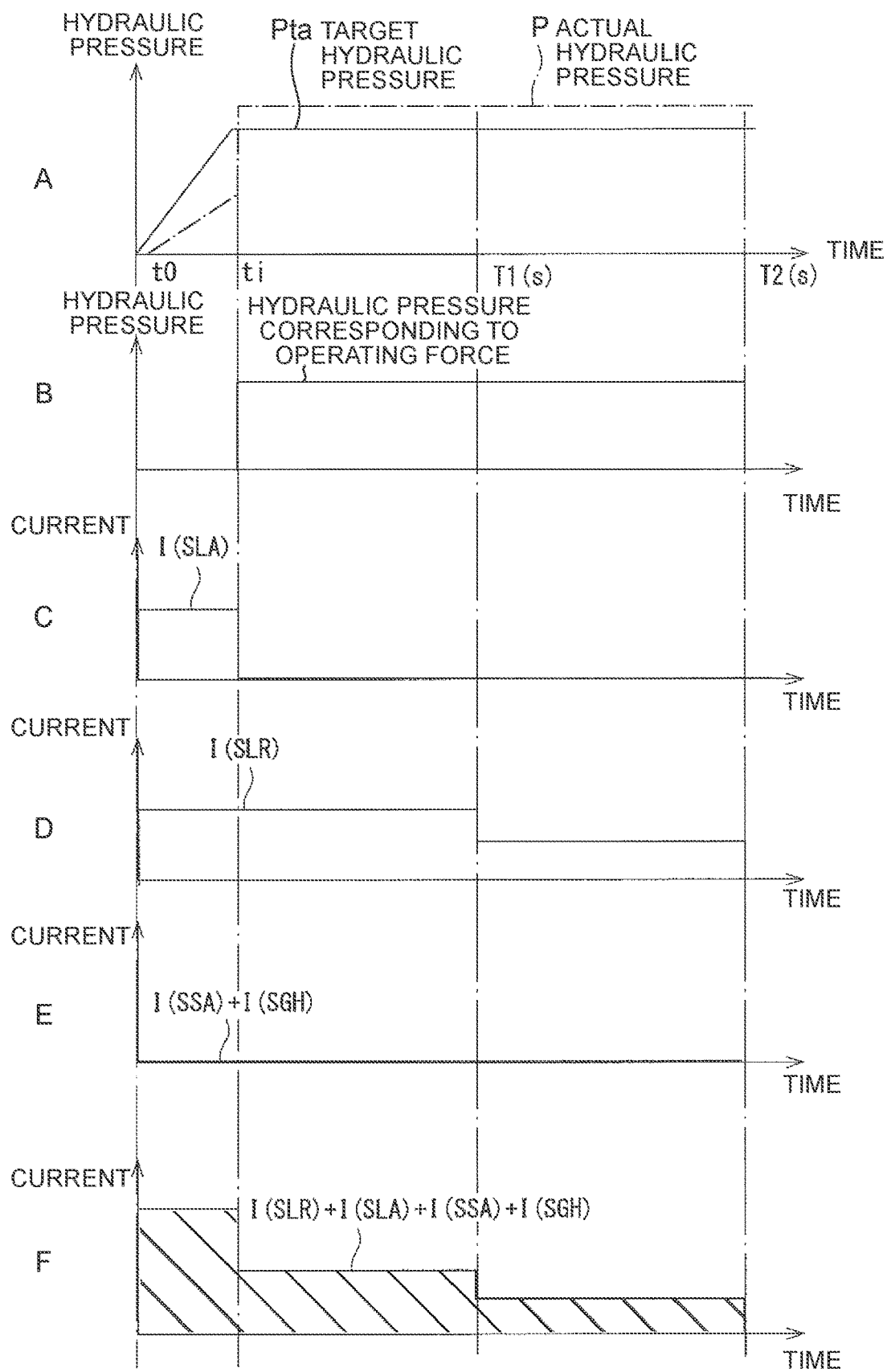
FIG. 7 illustrates a different operation state of the vehicle brake system, in which A is a graph indicating variations in the target hydraulic pressure and the actual hydraulic pressure, B is a graph indicating variations in the hydraulic pressure corresponding to an operating force, C is a graph indicating variations in the current to be supplied to a pressure increasing linear valve, D is a graph indicating variations in the current to be supplied to a pressure decreasing linear valve, E is a graph indicating variations in the currents to be supplied to an input chamber shut-off valve and a reservoir communication valve, and F is a graph indicating variations in the current consumed by an upstream hydraulic control mechanism.
Figure 8:
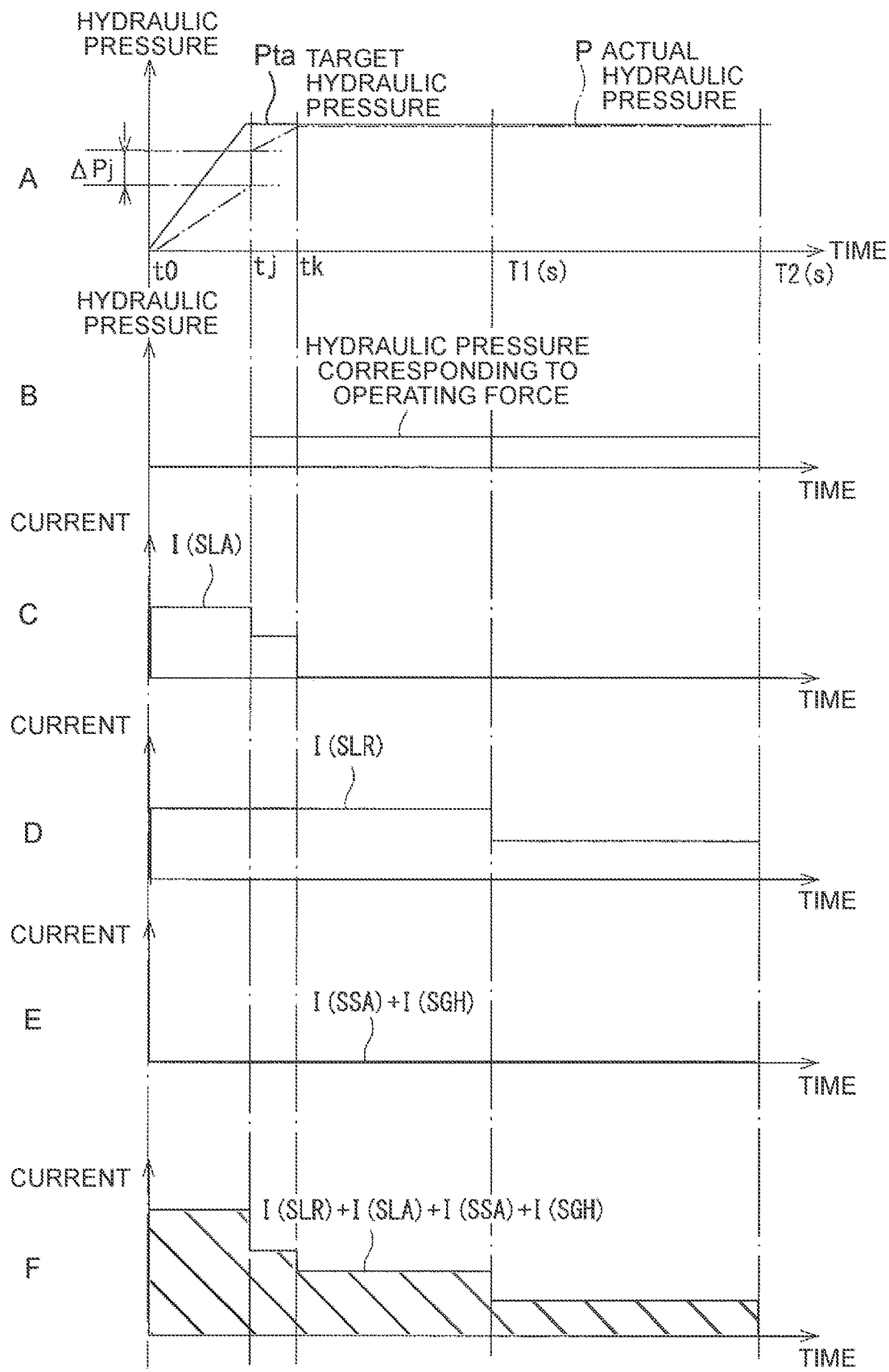
FIG. 8 illustrates a further different operation state of the vehicle brake system, in which A is a graph indicating variations in the target hydraulic pressure and the actual hydraulic pressure, B is a graph indicating variations in the hydraulic pressure corresponding to an operating force, C is a graph indicating variations in the current to be supplied to a pressure increasing linear valve, D is a graph indicating variations in the current to be supplied to a pressure decreasing linear valve, E is a graph indicating variations in the currents to be supplied to an input chamber shut-off valve and a reservoir communication valve, and F is a graph indicating variations in the current consumed by an upstream hydraulic control mechanism.

Specific control examples according to the present embodiment will be described with reference to FIGS. 6 to 8. FIG. 6 illustrates an example of a case where the brake pedal 24 is not operated (graph B in FIG. 6). FIGS. 7 and 8 each illustrate a case where the brake pedal 24 is operated (graph B in FIG. 7 and graph B in FIG. 8).

As illustrated in graph A in FIG. 6, it is detected at time t0 that the voltage of the main power source 270 is lower than the set voltage (the main power source 270 has failed), and the abnormal-time control is started. In the abnormal-time control, the target hydraulic pressure Pta is increased as indicated by the continuous line, and the current supplied to the solenoid of the pressure increasing linear valve 94 is controlled in the range not exceeding (X−a) with the current supplied to the solenoid of the pressure decreasing linear valve 96 brought to the first set current value a, as illustrated in graph C in FIG. 6 and graph D in FIG. 6, with the current supplied to the solenoids of the input chamber shut-off valve (SGH) 76 and the reservoir communication valve (SSA) 82 brought to zero, as illustrated in graph E in FIG. 6. Consequently, as illustrated in graph A in FIG. 6, the actual hydraulic pressure P is increased as indicated by the long dashed short dashed line, and brought closer to the target hydraulic pressure Pta at time th. As illustrated in graph C in FIG. 6, the current supplied to the solenoid of the pressure increasing linear valve 94 is brought to zero at time th, which closes the pressure increasing linear valve 94. The hydraulic pressure in the control chamber 122 is held.

Meanwhile, as illustrated in graph D in FIG. 6, the current supplied to the solenoid of the pressure decreasing linear valve 96 is held at the first set current value a until time T1 elapses since the start of the abnormal-time control, but is brought to the second set current value b after time T1 elapses, and brought to zero when time T2 elapses. The current consumed by the upstream hydraulic control mechanism 16 is decreased as the time elapses as illustrated in graph F in FIG. 6, which reduces power consumption (hatched portion).

As illustrated in graph A in FIG. 7 and graph B in FIG. 7, the actual hydraulic pressure P exceeds the target hydraulic pressure Pta when the brake pedal 24 is operated after time ti has elapsed since the failure of the main power source 270 was detected. Therefore, as illustrated in graph C in FIG. 7, the current supplied to the solenoid of the pressure increasing linear valve 94 is brought to zero, and the hydraulic pressure in the back-surface chamber 44 is held. As illustrated in graph D in FIG. 7, on the other hand, the current supplied to the solenoid of the pressure decreasing linear valve 96 is decreased from the first set current value a to the second set current value b when time T1 elapses, and is brought to zero when time T2 elapses. As illustrated in graph F in FIG. 7, the power consumption by the solenoids of the pressure increasing linear valve 94 and the pressure decreasing linear valve 96 is decreased early, and the power consumption by the upstream hydraulic control mechanism 16 is reduced.

As illustrated in graph A in FIG. 8 and graph B in FIG. 8, the brake pedal 24 is operated when time tj has elapsed after the failure of the main power source 270 was detected, and the hydraulic pressures in the wheel cylinders 36, 38 are increased by ΔPj. The difference between the actual hydraulic pressure P and the target hydraulic pressure Pta is reduced, although the actual hydraulic pressure P does not reach the target hydraulic pressure Pta. Therefore, as illustrated in graph C in FIG. 8, the current supplied to the solenoid of the pressure increasing linear valve 94 is decreased. Then, after the lapse of time tk, the actual hydraulic pressure substantially reaches the target hydraulic pressure, and therefore the current supplied to the solenoid of the pressure increasing linear valve 94 is brought to zero. Similarly, as illustrated in graph D in FIG. 8, the current supplied to the solenoid of the pressure decreasing linear valve 96 is decreased stepwise, and brought to zero when time T2 elapses. As illustrated in graph F in FIG. 8, the power consumption by the upstream hydraulic control mechanism 16 is reduced.

When the current supplied to the solenoid of the pressure increasing linear valve 94 is brought to zero after the lapse of time tk in FIG. 8 after the lapse of time ti since the start of the abnormal-time control in FIG. 7, the control chamber 122 is shut off from the high-pressure source 90 and the reservoir 82. Meanwhile, the hydraulic pressure in the pressurizing chamber 46 is supplied to the pilot pressure chamber 120. Consequently, the pilot piston 112 and the control piston 114 are advanced, and the hydraulic pressure in the servo chamber 124 is controlled and supplied to the back-surface chamber 44. As a result, even if the control chamber 122 is shut off, a reduction in the hydraulic pressure in the back-surface chamber 44 is suppressed, advancement of the brake pedal 24 is allowed, and a hydraulic pressure based on the operating force and the hydraulic pressure in the back-surface chamber 44 is generated in the pressurizing chambers 46, 47.

In this manner, in the present embodiment, the upstream hydraulic control mechanism 16 is actuated by power from the sub power source 272 when the main power source 270 has failed during the remote parking control. The currents supplied to the input chamber shut-off valve 76 and the reservoir communication valve 82 are brought to zero, and the hydraulic pressure in the back-surface chamber 44 is controlled and the hydraulic pressures in the wheel cylinders 36, 38 are controlled by controlling the pressure increasing linear valve 94 and the pressure decreasing linear valve 96. As a result, the upstream hydraulic control mechanism 16 can be controlled while reducing power consumption. In addition, the vehicle can be stopped by actuating the hydraulic brakes 12, 14, even if the driver is not on the vehicle, or even if the driver does not operate the brake pedal 24, by controlling the pressure increasing linear valve 94 and the pressure decreasing linear valve 96.

When the remote parking control is performed, in particular, the driver is often not present, or the brake pedal 24 is not operated. In the present embodiment, on the contrary, the hydraulic brakes 12, 14 can be actuated even if the main power source 270 has failed and the brake pedal 24 is not operated.

In the present embodiment, the upstream hydraulic control mechanism 16 corresponds to the hydraulic pressure supply device, a portion of the control device 20 that stores S3, a portion thereof that executes S3, etc. constitute the motor control unit, and a portion of the control device 20 that stores S7, a portion thereof that executes S7, etc. constitute the abnormal-time control unit. In addition, the SBW ECU 234 corresponds to the parking lock control unit. Further, the pressure increasing linear valve (SLA) 94 and the pressure decreasing linear valve (SLR) 96 correspond to the first electromagnetic valve, and the input chamber shut-off valve (SGH) 76 and the reservoir communication valve (SSA) 82 correspond to the second electromagnetic valve.

While the upstream hydraulic control mechanism 16 corresponds to the hydraulic pressure supply device in the embodiment described above, the downstream hydraulic control mechanism 18 may correspond to the hydraulic pressure supply device.

In addition, the control device is not limited to including a plurality of ECUs, and may include a single ECU. Further, the control device may include the upstream brake ECU 236 and the downstream brake ECU 238.

Besides the aspects described above, the present disclosure can be implemented in aspects with a variety of changes and improvements based on the knowledge of a person skilled in the art. For example, the brake circuit may have any structure.

(1) A vehicle brake system including: a hydraulic brake provided for a wheel of a vehicle to suppress rotation of the wheel in accordance with a hydraulic pressure; a hydraulic pressure supply device including a high-pressure source that can supply a high hydraulic pressure and a plurality of electromagnetic valves and being able to supply the hydraulic pressure from the high-pressure source to the hydraulic brake by controlling the hydraulic pressure using one or more first electromagnetic valves, among the electromagnetic valves; and a control device that performs drive assist control on the vehicle by performing control including control on the hydraulic pressure supply device, in which the vehicle includes a first power source that supplies power to the vehicle brake system, and the control device controls a current supplied to a solenoid of the one or more first electromagnetic valves with a current supplied to a solenoid of one or more second electromagnetic valves, among the electromagnetic valves, brought to zero when a voltage of the first power source is lower than a set voltage during the drive assist control, the one or more second electromagnetic valves being different from the one or more first electromagnetic valves.

The first electromagnetic valve and the second electromagnetic valve may each be an electromagnetic on/off valve or an electromagnetic linear valve. For example, the first electromagnetic valve can be an electromagnetic linear valve, and the second electromagnetic valve can be an electromagnetic on/off valve. The electromagnetic valves may include one or more electromagnetic valves, besides the one or more first electromagnetic valves and the one or more second electromagnetic valves.

Control (which may be referred to as "abnormal-time control") performed by the control device when the voltage of the first power source is lower than the set voltage may be performed under the drive assist control, or may be performed under control (e.g. abnormal-time control) that is different from the drive assist control.

The drive assist control includes control for the hydraulic pressure supply device. For example, the drive assist control includes control (automatic brake control) performed under control by the hydraulic pressure supply device, control (such as automatic drive control, automatic parking control, and remote parking control) performed by controlling the hydraulic pressure supply device and a device (such as the HV/EFI and the EPS, for example) that is mounted on the vehicle and that is different from the hydraulic pressure supply device, etc.

(2) The vehicle brake system according to (1), further including a second power source provided in the vehicle separately from the first power source and being able to supply power to the vehicle brake system when the voltage of the first power source is lower than the set voltage, in which the control device controls the current supplied to the solenoid of the one or more first electromagnetic valves with the current supplied to the solenoid of the one or more second electromagnetic valves brought to zero when power is supplied from the second power source to the vehicle brake system during the drive assist control.

(3) The vehicle brake system according to (1) or (2), in which the hydraulic pressure supply device includes a master cylinder that includes a pressurizing piston, a back-surface chamber provided in rear of the pressurizing piston, and a pressurizing chamber provided in front of the pressurizing piston, the master cylinder supplying a hydraulic pressure in the pressurizing chamber to the hydraulic brake, and a back-surface hydraulic pressure control device connected to the back-surface chamber and being able to control a hydraulic pressure in the back-surface chamber using the one or more first electromagnetic valves, and the one or more second electromagnetic valves are provided between the master cylinder and at least one of a stroke simulator and a reservoir.

(4) The vehicle brake system according to (3), in which the master cylinder includes an input piston that operates in conjunction with a brake operation member and that is provided in rear of the pressurizing piston via an input chamber so as to be movable relative to the pressurizing piston, the one or more second electromagnetic valves include an input chamber shut-off valve provided between the input chamber and the stroke simulator, and the input chamber shut-off valve shuts off the input chamber from the stroke simulator by being closed when a current supplied to a solenoid of the input chamber shut-off valve is zero.

(5) The vehicle brake system according to (3) or (4), in which the master cylinder includes an annular chamber provided at an intermediate outer peripheral portion of the pressurizing piston, the one or more second electromagnetic valves include a reservoir communication valve provided between the annular chamber and the reservoir, the reservoir communication valve communicates the annular chamber with the reservoir by being opened when a current supplied to a solenoid of the reservoir communication valve is zero.

The currents supplied to both the solenoids of the input chamber shut-off valve and the reservoir communication valve may be brought to zero, or the current supplied to one of the solenoids of the input chamber shut-off valve and the reservoir communication valve may be brought to zero, when the voltage of the first power source is lower than the set voltage.

(6) The vehicle brake system according to any one of (3) to (5), in which the back-surface hydraulic pressure control device includes a regulator to be actuated in accordance with a hydraulic pressure in a control chamber, the one or more first electromagnetic valves include a pressure increasing linear valve provided between the control chamber and the high-pressure source and a pressure decreasing linear valve provided between the control chamber and a low-pressure source, and the control device brings the current supplied to the solenoid of the one or more second electromagnetic valves to zero, and controls a current supplied to a solenoid of the pressure increasing linear valve and a current supplied to a solenoid of the pressure decreasing linear valve, when the voltage of the first power source is lower than the set voltage during the drive assist control.

(7) The vehicle brake system according to (6), in which the control device controls each of the current supplied to the solenoid of the pressure increasing linear valve and the current supplied to the solenoid of the pressure decreasing linear valve such that a sum of the currents does not exceed a limit current value.

(8) The vehicle brake system according to (7), in which the control device supplies a current with a first set current value to the solenoid of the pressure decreasing linear valve, and controls the current supplied to the solenoid of the pressure increasing linear valve in a range not exceeding a current with a value obtained by subtracting the first set current value from the limit current value.

(9) The vehicle brake system according to (8), in which the control device decreases the current supplied to the pressure decreasing linear valve to a second set current value that which is smaller than the first set current value when a time that has elapsed since the voltage of the first power source becomes lower than the set voltage exceeds a first set time.

A large braking force is required to stop a vehicle, and a braking force required to maintain a vehicle in a stationary state is smaller than the braking force required for braking. Therefore, the current supplied to the pressure decreasing linear valve may be reduced.

(10) The vehicle brake system according to (9), in which the control device ends control for the current supplied to the solenoid of the pressure increasing linear valve and control for the current supplied to the solenoid of the pressure decreasing linear valve when the time that has elapsed since the voltage of the first power source becomes lower than the set voltage exceeds a second set time that is longer than the first set time.

The current supplied to the solenoid of the pressure increasing linear valve and the current supplied to the solenoid of the pressure decreasing linear valve are brought to zero by ending the control. The control chamber is shut off from the high-pressure source and communicated with the reservoir so that the hydraulic pressure in the control chamber is brought to the atmospheric pressure.

(11) The vehicle brake system according to (10), in which the vehicle includes a plurality of wheels, the wheels including one or more drive wheels to which an output of a drive source of the vehicle is transferred, the vehicle brake system includes a parking lock mechanism that locks rotation of a drive transfer shaft that transfers the output of the drive source of the vehicle to the one or more drive wheels, and the control device locks rotation of the drive transfer shaft by actuating the parking lock mechanism before the time that has elapsed since the voltage of the first power source becomes lower than the set voltage reaches the second set time.

Since rotation of the drive transfer shaft is hindered before the second set time is reached, the hydraulic brake may be disengaged by ending the control for the pressure increasing linear valve and the pressure decreasing linear valve after the second set time has elapsed.

(12) The vehicle brake system according to any one of (3) to (11), in which the control device controls the current supplied to the pressure increasing linear valve such that the actual hydraulic pressure of the hydraulic brake is brought closer to a target hydraulic pressure, and the actual hydraulic pressure is acquired based on the operating state of the brake operation member and the hydraulic pressure in the back-surface chamber.

The target hydraulic pressure is determined so as to have a magnitude that may stop the vehicle. The target hydraulic pressure is not determined based on the operating state of the brake operation member. The hydraulic pressure in the hydraulic brake is estimated to be equal to the hydraulic pressure in the pressurizing chamber. Therefore, the hydraulic pressure in the pressurizing chamber is used as the actual hydraulic pressure.

(13) The vehicle brake system according to any one of (1) to (12), in which the high-pressure source includes a pump motor, a pump to be actuated by the pump motor, and an accumulator that stores a hydraulic pressure discharged from the pump, and the vehicle brake system includes a normal-time motor control unit that raises the hydraulic pressure in the accumulator to be higher than a set pressure determined in advance by actuating the pump motor before the drive assist control is started.

The set pressure may be the lower limit value or the upper limit value of a set range, or may be a value between the lower limit value and the upper limit value. The set pressure may correspond to a hydraulic pressure required to stop the vehicle once. (14) The vehicle brake system according to any one of (1) to (13), in which the drive assist control includes automatic brake control for automatically actuating the hydraulic brake even if the driver does not operate the brake operation member.

Examples include remote parking control, parking assist control, and automatic drive. Other examples include control for a situation in which an operation of the brake operation member is not expected.

(15) A vehicle brake system including: a hydraulic brake provided for a wheel of a vehicle to suppress rotation of the wheel in accordance with a hydraulic pressure; a hydraulic pressure supply device including a high-pressure source that can supply a high hydraulic pressure and a plurality of electromagnetic valves and being able to supply the hydraulic pressure from the high-pressure source to the hydraulic brake by controlling the hydraulic pressure using one or more first electromagnetic valves, among the electromagnetic valves; and a control device that performs control on the hydraulic pressure supply device, in which the hydraulic pressure supply device includes a master cylinder that includes a pressurizing piston, a back-surface chamber provided in rear of the pressurizing piston, and a pressurizing chamber provided in front of the pressurizing piston, the master cylinder supplying a hydraulic pressure in the pressurizing chamber to the hydraulic brake, and a back-surface hydraulic pressure control device connected to the back-surface chamber and being able to control a hydraulic pressure in the back-surface chamber using the first electromagnetic valves, one or more second electromagnetic valves, among the electromagnetic valves, are provided between the master cylinder and at least one of a stroke simulator and a reservoir, the second electromagnetic valves being different from the first electromagnetic valves, the vehicle including a first power source that supplies power to the vehicle brake system, and the control device controls a current supplied to a solenoid of the one or more first electromagnetic valves with a current supplied to a solenoid of the one or more second electromagnetic valves brought to zero when a voltage of the first power source is lower than a set voltage.

The vehicle brake system according to this article can adopt the technical characteristic according to any one of (1) to (14).

(16) A drive assist system including: a vehicle brake system including a hydraulic brake provided for a wheel of a vehicle to suppress rotation of the wheel in accordance with a hydraulic pressure, and a hydraulic pressure supply device including a high-pressure source that can supply a high hydraulic pressure and a plurality of electromagnetic valves and being able to supply the hydraulic pressure from the high-pressure source to the hydraulic brake by controlling the hydraulic pressure using one or more first electromagnetic valves, among the electromagnetic valves; a parking lock mechanism that locks rotation of a drive transfer shaft that transfers an output of a drive source of the vehicle to drive wheels; a first power source that supplies power to the vehicle brake system and the parking lock mechanism; and a control device that performs drive assist control for assisting drive of the vehicle by controlling the hydraulic pressure supply device and the parking lock mechanism, in which the control device controls a current supplied to a solenoid of the one or more first electromagnetic valves with a current supplied to a solenoid of one or more second electromagnetic valves, among the electromagnetic valves, brought to zero when a voltage of the first power source is lower than a set voltage during the drive assist control, the one or more second electromagnetic valves being different from the one or more first electromagnetic valves, and the parking lock mechanism is actuated to lock the drive transfer shaft before a set time elapses since the voltage of the first power source has become lower than the set voltage.

The drive assist system according to this article can adopt the technical characteristic according to any one of (1) to (15). The set time corresponds to the second set time.

What is claimed is:
1. A vehicle control system comprising:
a first power source; and
a brake mechanism including
 a hydraulic brake provided for a wheel of a vehicle and configured to suppress rotation of the wheel in accordance with a hydraulic pressure,
 a hydraulic pressure supply device including a high-pressure source configured to supply a high hydraulic pressure and a plurality of electromagnetic valves, and configured to supply the hydraulic pressure from the high-pressure source to the hydraulic brake by controlling the hydraulic pressure by using one or more first electromagnetic valves among the electromagnetic valves, and
 a control device configured to perform drive assist control on the vehicle by performing control having control on the hydraulic pressure supply device, wherein
the hydraulic pressure supply device includes a master cylinder that includes a pressurizing piston;
the master cylinder has a back-surface chamber located rearward of the pressurizing piston and a pressurizing chamber located forward of the pressurizing piston;
the master cylinder is configured to supply a hydraulic pressure in the pressurizing chamber to the hydraulic brake;
the hydraulic pressure supply device includes a back-surface hydraulic pressure control device connected to the back-surface chamber and configured to control a hydraulic pressure in the back-surface chamber by using the one or more first electromagnetic valves; and
one or more second electromagnetic valves among the electromagnetic valves are provided between the master cylinder and at least one of a stroke simulator and a reservoir,
the first power source is configured to supply power to the brake mechanism, and
the control device is configured to control a current supplied to a solenoid of the second electromagnetic valves to be zero and control a current supplied to a solenoid of the one or more first electromagnetic valves among the electromagnetic valves when a voltage of the first power source is lower than a set voltage during the drive assist control, the one or more second electromagnetic valves being different from the one or more first electromagnetic valves, the one or more first electromagnetic valves comprising one or more of a pressure increasing linear valve and a pressure decreasing linear valve and the one or more second electromagnetic valves comprising one or more of an input chamber shut-off valve and a reservoir communication valve.

2. The vehicle control system according to claim 1, further comprising a second power source configured to supply power to the brake mechanism when the voltage of the first power source is lower than the set voltage, wherein
the control device is configured to control the current supplied to the solenoid of the one or more second electromagnetic valves to be zero and the current supplied to the solenoid of the one or more first electromagnetic valves when power is supplied from the second power source to the brake mechanism during the drive assist control.

3. The vehicle control system according to claim 1, wherein
the master cylinder includes an input piston that operates in conjunction with a brake operation member and that is provided rearward of the pressurizing piston so as to move relative to the pressurizing piston via an input chamber,
the one or more second electromagnetic valves include an input chamber shut-off valve provided between the input chamber and the stroke simulator, and
the input chamber shut-off valve is configured to shut off the input chamber from the stroke simulator by being closed when a current supplied to a solenoid of the input chamber shut-off valve is zero.

4. The vehicle control system according to claim 1, wherein
the back-surface hydraulic pressure control device includes a regulator configured to be actuated in accordance with a hydraulic pressure in a control chamber;
the pressure increasing linear valve is provided between the control chamber and the high-pressure source, and
the pressure decreasing linear valve is provided between the control chamber and a low-pressure source; and the control device is configured to bring the current supplied to the solenoid of the one or more second electromagnetic valves to zero, and control a current supplied to a solenoid of the pressure increasing linear valve and a current supplied to a solenoid of the pressure decreasing linear valve, when the voltage of the first power source is lower than the set voltage during the drive assist control.

5. The vehicle control system according to claim 4, wherein the control device is configured to control each of the current supplied to the solenoid of the pressure increasing linear valve and the current supplied to the solenoid of the pressure decreasing linear valve such that a sum of the current supplied to the solenoid of the pressure increasing linear valve and the current supplied to the solenoid of the pressure decreasing linear valve does not exceed a limit current value.

6. The vehicle control system according to claim 5, wherein
the control device is configured to
supply a current of a first set current value to the solenoid of the pressure decreasing linear valve, and
control the current supplied to the solenoid of the pressure increasing linear valve such that a range does not exceed a current of a value obtained by subtracting the first set current value from the limit current value.

7. The vehicle control system according to claim 6, wherein the control device is configured to decrease the current supplied to the pressure decreasing linear valve to a second set current value that is smaller than the first set current value, when a time that has elapsed since the voltage of the first power source becomes lower than the set voltage exceeds a first set time.

8. The vehicle control system according to claim 7, wherein the control device is configured to end control for the current supplied to the solenoid of the pressure increasing linear valve and control for the current supplied to the solenoid of the pressure decreasing linear valve when the time that has elapsed since the voltage of the first power source becomes lower than the set voltage exceeds a second set time that is longer than the first set time.

9. The vehicle control system according to claim 1, wherein
the high-pressure source includes a pump motor, a pump configured to be actuated by the pump motor, and an accumulator configured to store a hydraulic pressure discharged from the pump, and
the control device includes a motor control unit configured to raise the hydraulic pressure in the accumulator to be higher than a set pressure determined in advance by actuating the pump motor before the drive assist control is started.

10. A vehicle control system comprising:
a first power source; and
a brake mechanism including
a hydraulic brake provided for a wheel of a vehicle and configured to suppress rotation of the wheel in accordance with a hydraulic pressure,
a hydraulic pressure supply device including a high-pressure source configured to supply a high hydraulic pressure, a first electromagnetic valve, and a second electromagnetic valve, and configured to supply the hydraulic pressure from the high-pressure source to the hydraulic brake by controlling the first electromagnetic valve by using the hydraulic pressure, and
a control device configured to perform drive assist control on the vehicle by controlling the hydraulic pressure supply device, wherein
the hydraulic pressure supply device includes a master cylinder that includes a pressurizing piston;
the master cylinder has a back-surface chamber located rearward of the pressurizing piston and a pressurizing chamber located forward of the pressurizing piston;
the master cylinder is configured to supply a hydraulic pressure in the pressurizing chamber to the hydraulic brake;
the hydraulic pressure supply device includes a back-surface hydraulic pressure control device connected to the back-surface chamber and configured to control a hydraulic pressure in the back-surface chamber by using the first electromagnetic valve; and
the second electromagnetic valve is provided between the master cylinder and at least one of a stroke simulator and a reservoir,
the first power source is configured to supply power to the brake mechanism, and
the control device is configured to perform control such that the control device suspends supply of a current to a solenoid of the second electromagnetic valve and supplies a current to a solenoid of the first electromagnetic valve when a voltage of the first power source is lower than a set voltage during the drive assist control, the first electromagnetic valve comprising one or more of a pressure increasing linear valve and a pressure decreasing linear valve and the second electromagnetic valve comprising one or more of an input chamber shut-off valve and a reservoir communication valve.

* * * * *